Figure 1:
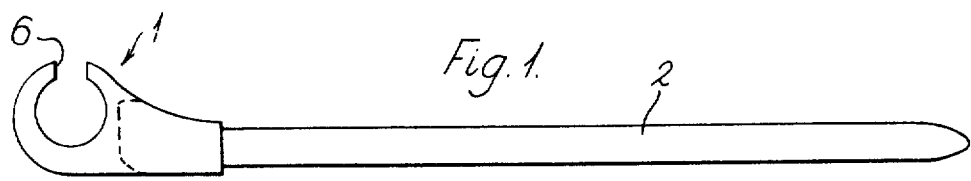
Figure 2:
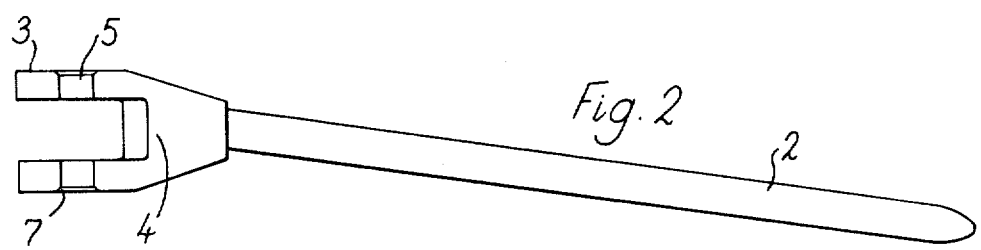
Figure 3:
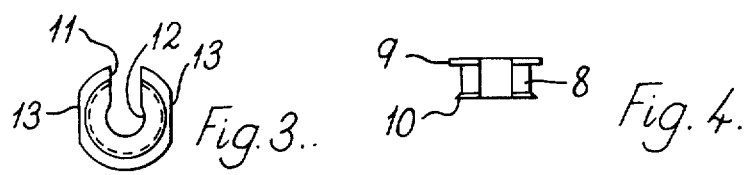
Figure 4:
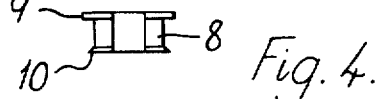

United States Patent

Lowe et al.

[11] 3,879,766
[45] Apr. 29, 1975

[54] ENDOPROSTHETIC BONE JOINT DEVICE

[75] Inventors: Stewart Arthur Lowe, Daviot; John Tracey Scales, Stanmore, both of England

[73] Assignee: National Research Development Corporation, London, England

[22] Filed: Oct. 11, 1973

[21] Appl. No.: 405,457

[30] Foreign Application Priority Data
Oct. 19, 1972   United Kingdom............. 48197/72

[52] U.S. Cl. .................................... 3/1; 128/92 C
[51] Int. Cl. ................................................ A61f 1/24
[58] Field of Search .............. 3/1, 12, 12.2, 12.3; 128/92 C, 92 CA, 92 R

[56] References Cited
UNITED STATES PATENTS
3,656,186   4/1972   Dee................................ 3/1
3,708,805   1/1973   Scales et al..................... 3/1
3,805,302   4/1974   Mathus........................... 3/1

FOREIGN PATENTS OR APPLICATIONS
1,902,700   8/1970   Germany........................ 3/1
1,047,640   7/1953   France....................... 128/92 C

*Primary Examiner*—Ronald L. Frinks
*Attorney, Agent, or Firm*—Cushman, Darby & Cushman

[57] ABSTRACT

An endoprosthetic bone joint device of hinge form with intramedullary stems for fixation is provided with a snap-fit mechanism. One hinge component has a female bearing part of longitudinal slotted annular form with a bush of similar form in its annular cavity, and a second hinge component has a male bearing part including an axle. The axle is a clearance fit with the female bearing part slot and the bush annular cavity, but an interference fit with the bush slot.

8 Claims, 7 Drawing Figures

ENDOPROSTHETIC BONE JOINT DEVICE

This invention concerns prosthetic devices and more particularly endoprosthetic bone joint devices. The invention has been developed primarily in connection with replacement of the elbow joint and will be described more particularly with reference to this joint, although it will be appreciated that different forms of the invention can be used for replacement of other joints.

In any event, the present invention provides an endoprosthetic bone joint device comprising: a first hinge component having a female bearing part of annular form with a first slot along the longitudinal axial direction thereof to communicate the radially inner and outer surfaces of said annular form, and a first intramedullary stem extending laterally from said female bearing part relative to said axial direction; at least one annular brush seated in said female bearing part, which bush has a second slot formed in similar manner to, and aligned with, said first slot; and a second hinge component having a male bearing part including an axle coaxially rotatably seated in said bush, and a second intramedullary stem extending laterally from said male bearing part relative to said axial direction; said axle being a clearance fit relative to said first slot, and an interference fit relative to said second slot, for assembly of said device by passage of said axle through said slots; and one of said male and female bearing parts being of forked form to embrace the other one of such parts.

Figure 5:
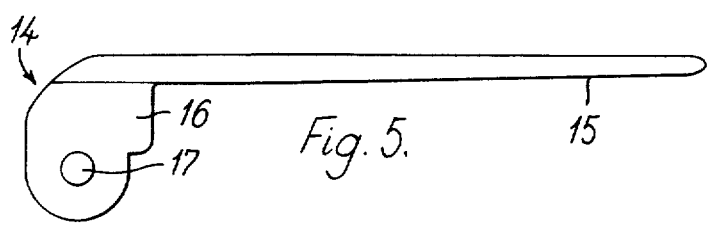
Figure 6:
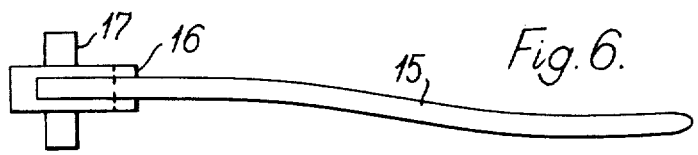
Figure 7:
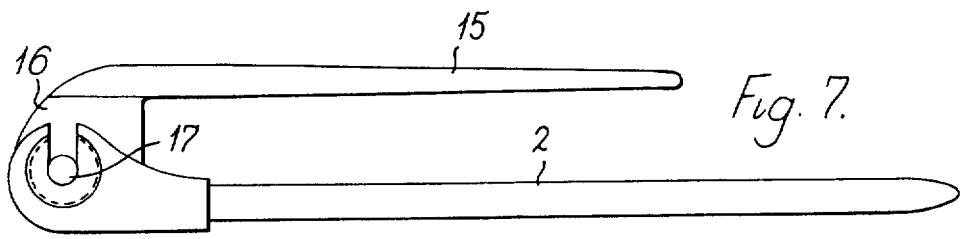

The above and other features of the invention will be clarified by the following description given by way of example with reference to the accompanying drawings, in which:

FIGS. 1 and 2, 3 and 4, and 5 and 6, are corresponding side and plan views of the first hinge component, a bush, and the second hinge component of an elbow joint device according to the invention, and FIG. 7 illustrates such device in side view when assembled.

In the drawings the first hinge component is the humeral component of the device and has a female bearing part 1 adapted for fixation to the humerus by the provision of a tapered intramedullary stem 2 extending at its widest end therefrom. The female bearing part 1 is of forked form having two like arms 3 joined by a bridge portion 4. Each arm is of annular form with a circular cylindrical central space 5, and is slotted at 6 along a longitudinal radial plane of its space 5 to communicate the interior and exterior of the annulus, the width of the slot being narrower than the diameter of the central space.

As seen in the side view of FIG. 1 the spaces 5 are coaxial, their slots 6 extend in a common radial plane, and the stem 2 is effectively orthogonally directed relative to such axis and plane. However, as seen in the plan view of FIG. 2, the longitudinal axis of the stem 2 is angled other than perpendicularly to that of the spaces 5 and this angling will be to one side of the perpendicular for left hand elbow joint devices and to the other side for right hand devices. The illustrated embodiment is in fact that of a left hand elbow joint device.

A remaining feature of the humeral component is a relatively short countersunk area 7 around the outer end of each space 5.

There will be two like bushes as illustrated, one for each arm 3. Each bush has a hollow circular cylindrical main body part 8 which is provided with a larger radial flange 9 at one end and a relatively small tapered flange 10 at the other end. In addition each bush is slotted at 11 in a longitudinal radial plane to communicate with the central space 12 in similar manner to that for the slot and central space of the female bearing part 1. The larger flange 9 of each bush is formed with two diametrally opposed flats 13 directed parallel to the slot 11, and each bush is dimensioned to seat, with its larger flange 9 innermost, in a respective one of the arms 3 with one of its flanges abutting the adjacent surface of the bridge portion 4. When fully seated the smaller flange 10 snaps into the corresponding countersunk area 7.

The second hinge component is the ulnar component of the device and has a male bearing part 14 adapted for fixation to the ulna by the provision of a tapered intramedullary stem 15 extending therefrom. More particularly, the male part 14 comprises a support member 16 in the form of a flange extending from the wider end of the stem 15 in a longitudinal plane of the latter, and a male bearing member is provided as a circular cylindrical axle 17 extending from both sides of the support member 16 in perpendicular relation with that member. As seen in FIG. 5, the stem 15 is in an effectively orthogonal relation with the support member 16 and the axle 17, with the stem being laterally off-set from the longitudinal axis of the axle, while, as seen in FIG. 6, the stem is generally inclined relative to the support member by curving the stem portion remote from the axle in corresponding handed manner to the humeral component stem 2.

The support member 16 is dimensioned to enter between the arms 3 of the female part 1, to engage the opposite end portions of the axle 17 in the respectively associated slots 6 and 11, and to seat the axle in the central spaces 12 of the bushes. More particularly, the relative dimensions are such that the axle 17 is a clearance fit in the slots 6 and the central spaces 12, but an interference fit in the slots 11. This provides an assembly which is engaged by a snap-fit action requiring significantly less force than that required for disengagement. In practice this arises from the fact that both actions entail opening of the bush slots and, because the bushes are constrained by the arms 3, opening of the arm slots 6 also, but these slots are opened by forces acting at the mouths of the slots during assembly and at the inner ends of the slots during disassembly, and the former forces exert greater leverage than the latter forces.

In development of the illustrated embodiment, use has been made of metal for the two stemmed components and plastics material for the bushes, with the current more particular preference being titanium alloy for the stemmed components, except the axle which is of chrome-cobalt alloy, and high density polyethylene for the bushes. While this choice is considered advantageous, it is not critical.

Also, while the invention has been described more particularly with reference to the illustrated embodiment, it is not intended that this should be regarded as unnecessarily limiting the broader scope of the invention. For example, while it will normally be more convenient to make the female bearing part forked, the male bearing part could be forked with an axle spanning the fork arms to engage a single female member received therebetween. Also, while it is convenient for the purposes of insertion that the bush slots be aligned with the slots of the fork arms by engagement of the bush flange flats, the bushes can be rotatable to further lock the hinge against disengagement after assembly by disaligning the slots.

We claim:

1. An endoprosthetic bone joint device comprising: a first hinge component having a female bearing part of annular form with a first slot along the longitudinal axial direction thereof to communicate the radially inner and outer surfaces of said annular form, and a first intramedullary stem extending laterally from said female bearing part relative to said axial direction; at least one annular bush seated in said female bearing part, which bush has a second slot formed in similar manner to, and aligned with, said first slot; and a second hinge component having a male bearing part including an axle coaxially rotatably seated in said bush, and a second intramedullary stem extending laterally from said male bearing part relative to said axial direction, said second slot having substantially parallel opposed side faces; said axle being a clearance fit relative to said first slot, and an interference fit relative to said second slot, for assembly of said device by passage of said axle through said slots; and one of said male and female bearing parts being of forked form to embrace the other one of such parts.

2. A device according to claim 1 wherein said bush is rotatably seated in said female bearing part to allow disalignment of said slots.

3. A device according to claim 1 wherein said female bearing part is of forked form having two arms of annular form with their respective first slots longitudinally aligned, and each of said arms having seated therein a respective bush with opposite end portions of said axle respectively seated in said bushes.

4. A device according to claim 3 wherein the radially inner surface of each of said arms is substantially circular cylindrical and outwardly tapered around the longitudinally outermost end thereof to define a countersunk rim, and each of said bushes is of substantially circular cylindrical form having radially extending flanges around the longitudinal ends thereof, a first one of said flanges extending radially further than the second one of said flanges, and said second flange being tapered in complementary manner to said countersunk rim and seated therein as a snap fit.

5. A device according to claim 1 wherein said male bearing component comprises an axle-supporting member extending radially from said axle, and said second stem extends from said member in off-set relation with said axle and generally mutually orthogonal relation with said axle and said member.

6. An elbow joint device according to claim 5 wherein said stems are each inclined over at least a longitudinal portion thereof towards a common end of said axle.

7. A device according to claim 1 wherein said hinge components are made of metal and each bush of plastics material.

8. An endoprosthetic bone joint device comprising:

a first hinge component including a forked female bearing part with two fork arms of annular form having like longitudinally-aligned respective first bores therethrough and like longitudinally-aligned respective first slots radially communicating said first bores with the outer surfaces of said arms, and a first intramedullary stem extending laterally and remotely from said female bearing part relative to said first bores;

two bushes respectively seated in said first bores, said bushes being of similar annular form to said fork arms, having respective second bores coaxial with said first bores, and having respective second slots radially aligned with said first slots; and a second hinge component including a male bearing part in the form of an axle having its respective opposite end portions coaxially rotatably seated in said second bores, and a second intramedullary stem extending laterally from an intermediate portion of said axle, said axle being a clearance fit relative said first slots, and an interference fit relative to said second slots, for assembly of said device by successive passage of said axle through said first and second slots wherein said bushes are rotatably seated in said first bores to allow disalignment of said first and second slots thereby inhibiting release of said axle therethrough.

* * * * *